(12) United States Patent
Kang

(10) Patent No.: US 8,132,237 B2
(45) Date of Patent: Mar. 6, 2012

(54) SYSTEM OF ELECTRONIC DOCUMENT REPOSITORY WHICH GUARANTEES AUTHENTICITY OF THE ELECTRONIC DOCUMENT AND ISSUES CERTIFICATES AND METHOD OF REGISTERING, READING, ISSUING, TRANSFERRING, A CERTIFICATE ISSUING PERFORMED IN THE SYSTEM

(75) Inventor: Hyun Ku Kang, Seoul (KR)

(73) Assignee: National IT Industry Promotion Agency, Seoul (KR)

( * ) Notice: Subject to any disclaimer, the term of this patent is extended or adjusted under 35 U.S.C. 154(b) by 1016 days.

(21) Appl. No.: 11/915,968

(22) PCT Filed: Aug. 8, 2007

(86) PCT No.: PCT/KR2007/003802
§ 371 (c)(1),
(2), (4) Date: Nov. 29, 2007

(87) PCT Pub. No.: WO2008/018744
PCT Pub. Date: Feb. 14, 2008

(65) Prior Publication Data
US 2009/0307756 A1 Dec. 10, 2009

(30) Foreign Application Priority Data
Aug. 10, 2006 (KR) .................. 10-2006-0075526

(51) Int. Cl.
*G06F 7/04* (2006.01)

(52) U.S. Cl. .......................................................... 726/4
(58) Field of Classification Search .................. None
See application file for complete search history.

(56) References Cited

U.S. PATENT DOCUMENTS

| 6,289,460 | B1 | 9/2001 | Hajmiragha | |
|---|---|---|---|---|
| 2002/0016910 | A1 | 2/2002 | Wright | |
| 2002/0156737 | A1* | 10/2002 | Kahn et al. | 705/51 |
| 2002/0161721 | A1 | 10/2002 | Yuan et al. | |
| 2005/0038756 | A1 | 2/2005 | Nagel | |
| 2007/0156726 | A1* | 7/2007 | Levy | 707/100 |
| 2007/0208665 | A1* | 9/2007 | Ohara | 705/51 |

FOREIGN PATENT DOCUMENTS

| EP | 1617589 A2 | 1/2006 |
|---|---|---|
| EP | 1076954 B1 | 7/2006 |
| JP | 2001202436 A | 7/2001 |
| JP | 2003509784 T | 3/2003 |
| JP | 200648715 A | 2/2006 |
| KR | 10-2005-0078402 | 8/2005 |
| KR | 10-2006-0084032 | 7/2006 |

* cited by examiner

*Primary Examiner* — Brandon Hoffman
(74) *Attorney, Agent, or Firm* — The Webb Law Firm

(57) ABSTRACT

Provided are an electronic document repository system which guarantees authenticity of electronic document and issues certificates and methods of registering, reading, issuing, and transferring electronic documents in the system, and a method of issuing certificates in the system. The electronic document repository system includes an authentication module, a registration module, a reading module, an issuing module, and a certification module.

23 Claims, 9 Drawing Sheets

SYSTEM OF ELECTRONIC DOCUMENT REPOSITORY WHICH GUARANTEES AUTHENTICITY OF THE ELECTRONIC DOCUMENT AND ISSUES CERTIFICATES AND METHOD OF REGISTERING, READING, ISSUING, TRANSFERRING, A CERTIFICATE ISSUING PERFORMED IN THE SYSTEM

TECHNICAL FIELD

The present invention relates to an electronic document repository system for storing electronic documents in a licensed repository and issuing the electronic documents when the electronic documents are needed to be used for business. More particularly, the present invention relates to an electronic document repository system capable of maintaining authenticity of electronic documents stored in the repository system and issuing a certificate of original documents, methods for registering, reading, issuing, and transferring electronic documents in the system, and a method for issuing a certificate in the system.

BACKGROUND ART

Widespread use of Information Technology (IT) has led to a great change in business enterprise processes. Commercial transactions, such as purchases and sales, as well as business processes are performed in an electronic manner. This has resulted in business flow innovations, changes in methods and content of transactions, and changes in enterprise activities including communication with customers.

This change had been led by a shift from use of paper documents to use of electronic documents. By producing numerous documents in an electronic form or by producing numerous documents in a paper form and then converting the same to electronic form for use in business through, for example, electronic payment systems, electronic document management systems, electronic document exchange systems, and the like, process innovations with an aim of becoming 'paperless' are realized.

Current uses of documents include three types: use of paper documents, use of electronic documents, and use of both paper and electronic documents.

First, paper documents are produced and distributed in a paper form and are ordinarily used by most people. The use of paper documents allows for easy verification of forgeries and falsifications but is costly in terms of retrieval, distribution and storage of the documents.

Recently, electronic documents have been widely used, distributed and stored by electronic payment systems, document management systems, and the like, of businesses. The use of the electronic documents can reduce retrieval and storage cost and can realize rapid business processing, but such electronic documents can be easily forged, falsified and copied. In addition, the use of the electronic documents is affected by storage medium types.

The use of both paper documents and electronic documents may be found, for example, when contracts are written at a bank, with a paper document produced and scanned to obtain an electronic document. This use is intended to solve shortcomings of the use of paper documents or electronic documents solely, but increases storage cost due to dual storage.

Accordingly, there is a need for a scheme capable of solving the aforementioned problems and allowing for efficient use of electronic documents. In particular, there is a need for an electronic document repository system capable of guaranteeing authenticity of electronic documents stored therein through reinforced security, and guaranteeing reliable distribution of the electronic documents between enterprises or individuals by issuing an authenticity certificate.

DISCLOSURE

Technical Problem

It is an object of the present invention to provide an electronic document repository system which guarantees authenticity of electronic documents and issues certificates and methods of registering, reading, issuing, and transferring the electronic documents in the system, and a method of issuing certificates in the system.

Technical Solution

According to a first aspect of the present invention, there is provided an electronic document repository system connected to a user terminal over a network for guaranteeing authenticity of an electronic document and issuing an authenticity certificate, the system comprising: an authentication module for performing user authentication through a login process and controlling a system access right depending on a user when the user connects to the electronic document repository system; a registration module for checking an electronic document information package sent by the user, producing metadata, appending authentication information to the electronic document information package, and registering the resultant electronic document in a database; a reading module for producing a reading information package according to a user's reading right, performing security processing on the reading information package, and transmitting the resultant reading information package to the user upon receipt of a request from the user to read the electronic document; an issuing module for producing an issuing information package according to a user's issue right, performing security processing on the issuing information package, and transmitting the resultant issuing information package to the user upon receipt of a request from the user to issue the electronic document; and a certification module for issuing a certificate of the electronic document to the user or verifying the issued certificate.

Preferably, in the authentication module, the user authentication uses a licensed certificate, and the control of the system access right uses an Access Control List (ACL). In the registration module, the electronic document sent by the user may be first produced in an electronic form or produced in an image form obtained by scanning a paper document.

Preferably, in the reading module, the electronic document is read in such a manner that the user terminal receives the reading information package and outputs content of the electronic document on a screen of the user terminal, and the content of the electronic document is prevented from being modified, copied, stored, and screen-captured when read so that authenticity of the electronic document is guaranteed.

Preferably, the issuing module produces the issuing information package with metadata, the electronic document, a time stamp, and an electronic signature.

Preferably, when issuing the certificate, the certification module generates a unique identifier of the certificate and a security value for guaranteeing integrity of the electronic document, the certificate including a name of an issue requester (a name of a corporation), an identification number of the issue requester, such as a National Identification number, a Social Security number, etc. (a corporate registration number of a corporation), a serial number of the certificate, an issue request date and an issue date of the certificate, a validity period of the certificate, use of the certificate, and repository identification information. In the certification module, the certificate verification may include verification of information for and a format of the issued certificate, verification of authenticity based on a verification route described in the certificate, verification of a certificate issue list of the repository system, and verification of integrity of the certificate based on an electronic signature, a time stamp value, and a hash value described in the certificate.

Preferably, the system further comprises a retrieval module for retrieving the registered electronic document from the database when the user desires to search for the electronic document. Preferably, the system further comprises a management module for discarding stored electronic documents or storing the same for a long period, and transferring the electronic documents to another storage medium or platform in the electronic document repository system. Preferably, the system further comprises a transfer module for checking a user's transfer right, transferring the registered electronic document to a receiving repository system, and discarding the electronic document stored in the database upon receipt of a request from the user to transfer the registered electronic document. Preferably, the system further comprises a printer module for controlling printing of the electronic document upon receipt of a request from the user to print electronic documents or various certificates, wherein the printer module checks a type of a printer connected to the user terminal and permits printing only if the printer is secure.

According to a second aspect of the present invention, there is provided a method of registering an electronic document in the electronic document repository system, the method comprising the steps of: (a) producing, by a user terminal, an electronic document information package containing the electronic document, metadata, and authentication information according to a predetermined information package standard; (b) transmitting, by the user terminal, the electronic document information package to the electronic document repository system, and requesting to register the electronic document; (c) receiving, by the registration module, the electronic document information package and performing quality inspection on the electronic document information package; (d) producing, by the registration module, additional metadata, appending authentication information to the electronic document information package, and storing the electronic document in the database; and (e) notifying, by the registration module, the user terminal that the registration has been completed.

Preferably, the quality inspection in step (c) includes checking for viruses, checking for errors, and verifying the metadata information of the electronic document described by the user.

Preferably, the certification module issues the registration certificate to the user upon receipt of a request for the registration certificate from the user.

According to a third aspect of the present invention, there is provided a method of reading an electronic document in the electronic document repository system, the method comprising the steps of: (a) requesting, by a user terminal, to read the electronic document; (b) checking, by a reading module, a user's reading right; (c) producing, by the reading module, a reading information package according to the user's reading conditions; (d) performing, by the reading module, security processing on the reading information package to guarantee authenticity of the electronic document; (e) performing security processing on the reading information package for transmission and reception, and transmitting the resultant reading information package to the user terminal; and (f) reading, by the user terminal, the electronic document by way of content of the electronic document output on a screen of the user terminal.

Preferably, step (c) comprises the steps of: initializing the reading information package; inserting metadata of the electronic document to be read into the reading information package; and converting the electronic document to be read that is stored in the electronic document repository system according to a user's request conditions, and inserting the converted electronic document into the reading information package.

According to a fourth aspect of the present invention, there is provided a method of issuing an electronic document in the electronic document repository system, the method comprising the steps of: requesting, by a user terminal, to issue the electronic document; checking, by an issuing module, a user's issue right; producing, by the issuing module, an issuing information package; producing, by the certification module, a certificate to certify that the issuing information package is an original document; and performing security processing on the issuing information package and the certificate of the original document for transmission and reception, and transmitting the same to the user terminal.

Preferably, metadata, the electronic document, a time stamp, and an electronic signature are inserted into the issuing information package.

According to a fifth aspect of the present invention, there is provided a method of transferring an electronic document in the electronic document repository system, the method comprising the steps of: (a) requesting, by a user terminal, a specific receiving repository system to transfer the electronic document; (b) checking, by a transfer module, a user's right; (c) inquiring, by the transfer module, of the receiving repository system as to whether transfer of the electronic document is possible; (d) sending, by the receiving repository system, a response to the inquiry to the transfer module; (e) when the transfer is possible, transferring the electronic document from the transfer electronic document repository system to the receiving electronic document repository system; and (f) checking, by the transfer module, the transfer and recording a transfer history.

Preferably, step (e) comprises the steps of: performing, by the transfer module of the transfer electronic document repository system, security processing for transmission and reception and transmitting the electronic document; receiving, by the receiving electronic document repository system, the electronic document and performing quality inspection on the electronic document; and registering, by the receiving electronic document repository system, the electronic document.

According to a sixth aspect of the present invention, there is provided a method of issuing a certificate of an electronic document in the electronic document repository system, the method comprising the steps of: (a) requesting, by a user terminal, to issue a certificate; (b) verifying, by a certification module, a certificate issue request; (c) when the certificate issue request can be accepted, producing the certificate by the certification module; (d) performing, by the certification module, security processing for transmission and reception and transmitting the certificate to the user terminal; and (e) modifying, by the certification module, a certificate issue list and recording a certificate issue history.

Preferably, the certificate includes a registration certificate for registering an electronic document, a certificate of an original document used for issuing an electronic document, a discard certificate for discarding an electronic document, an authenticity certificate required for storing an electronic document for a long period, and a transfer certificate for transferring an electronic document.

Preferably, step (c) includes producing the certificate by initializing a certificate format, inserting certificate related information into the certificate format, and performing security processing.

Advantageous Effects

As described above, according to the present invention, security of the electronic document repository system is reinforced to assure authenticity of the electronic document stored in the system. When a user requests to issue a certificate, the system issues an electronic document and a certificate of an original document, thereby guaranteeing reliability and integrity of the electronic document. Thus, the user can use the electronic document comfortably.

MODE FOR INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

Figure 1:
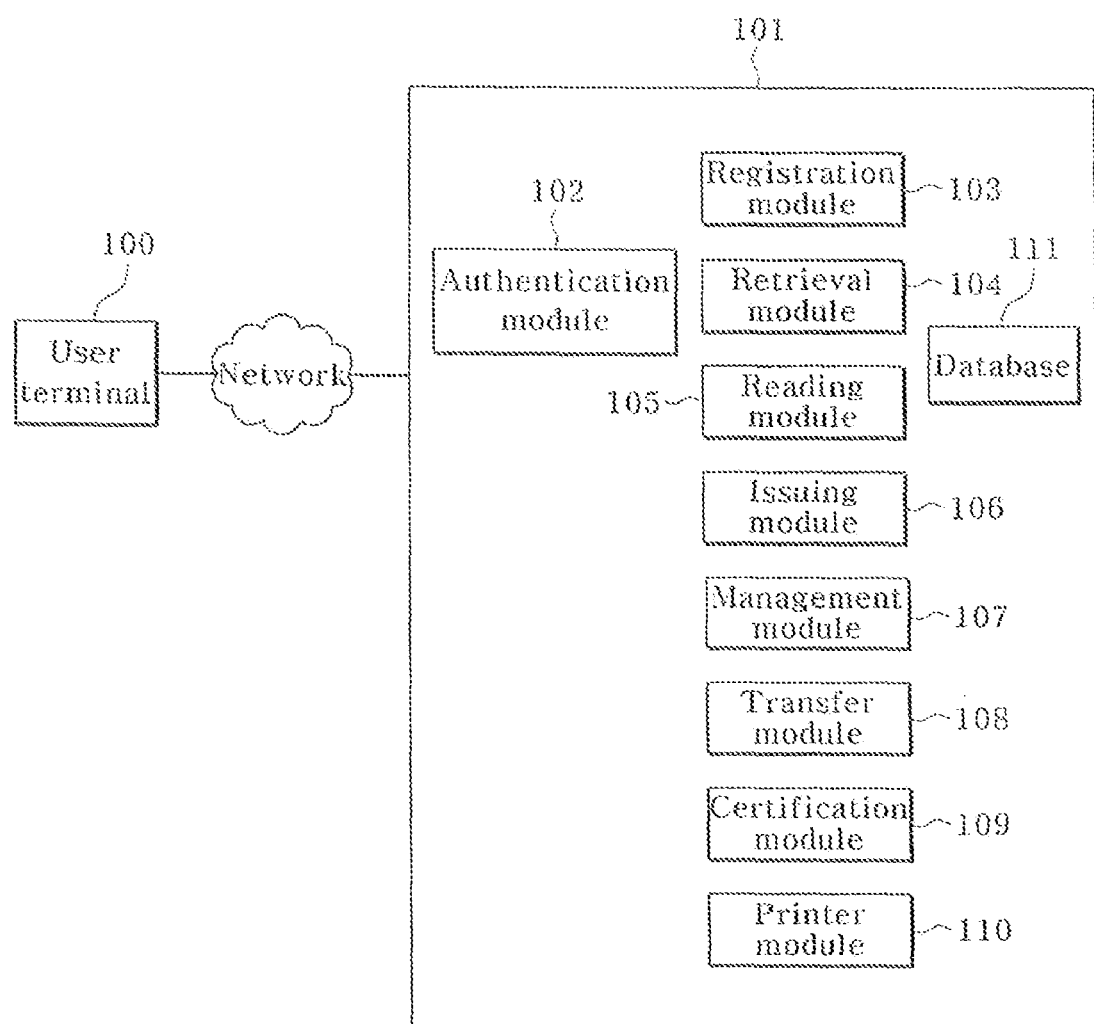
FIG. 1 is a block diagram illustrating an electronic document repository system according to an exemplary embodiment of the present invention.

FIG. 1 is a block diagram illustrating an electronic document repository system according to an exemplary embodiment of the present invention.

Referring to FIG. 1, an electronic document repository system 101 is connected to a user terminal 100 over a network, and includes an authentication module 102, a registration module 103, a retrieval module 104, a reading module 105, an issuing module 106, a management module 107, a transfer module 108, a certification module 109, a printer module 110, and a database 111.

First, the authentication module 102 performs user authentication through a login process when the user connects to the electronic document repository system 101. If the login fails, the authentication module 102 notifies the user of an error. If the login is successful, the authentication module 102 approves user access with a differentiated system access right. In other words, the authentication module 102 controls access to the registration module 103, the reading module 105, the issuing module 106, the management module 107, the transfer module 108, and the certification module 109 according to the user's system access right.

The user authentication may be performed by using a licensed certificate. When the electronic document repository system receives a request for login from the user, the authentication module 102 requests an external certified authentication authority to check the validity of a user's certificate. The certified authentication authority checks the validity of the user's certificate and sends an authentication result to the electronic document repository system. Alternatively, the authentication module of the electronic document repository system may have a function of verifying the certificate.

Preferably, the authentication module 102 manages users?access rights by using an Access Control List (ACL). The ACL is a table set to inform an operating system of the electronic document repository system of users?rights to access specific system objects, such as directories or files.

The registration module 103 registers an electronic document information package produced by the user in the database 111 of the electronic document repository system 101. The electronic document may be first produced in an electronic form by the user. Alternatively, the electronic document may be produced in an image form obtained by scanning a paper document.

When the user sends the electronic document to the electronic document repository system, the electronic document repository system checks the electronic document information package, produces metadata, appends authentication information such as an electronic signature to the electronic document information package, and stores the resultant electronic document in a storage medium, which guarantees authenticity of electronic documents.

Figure 2A:
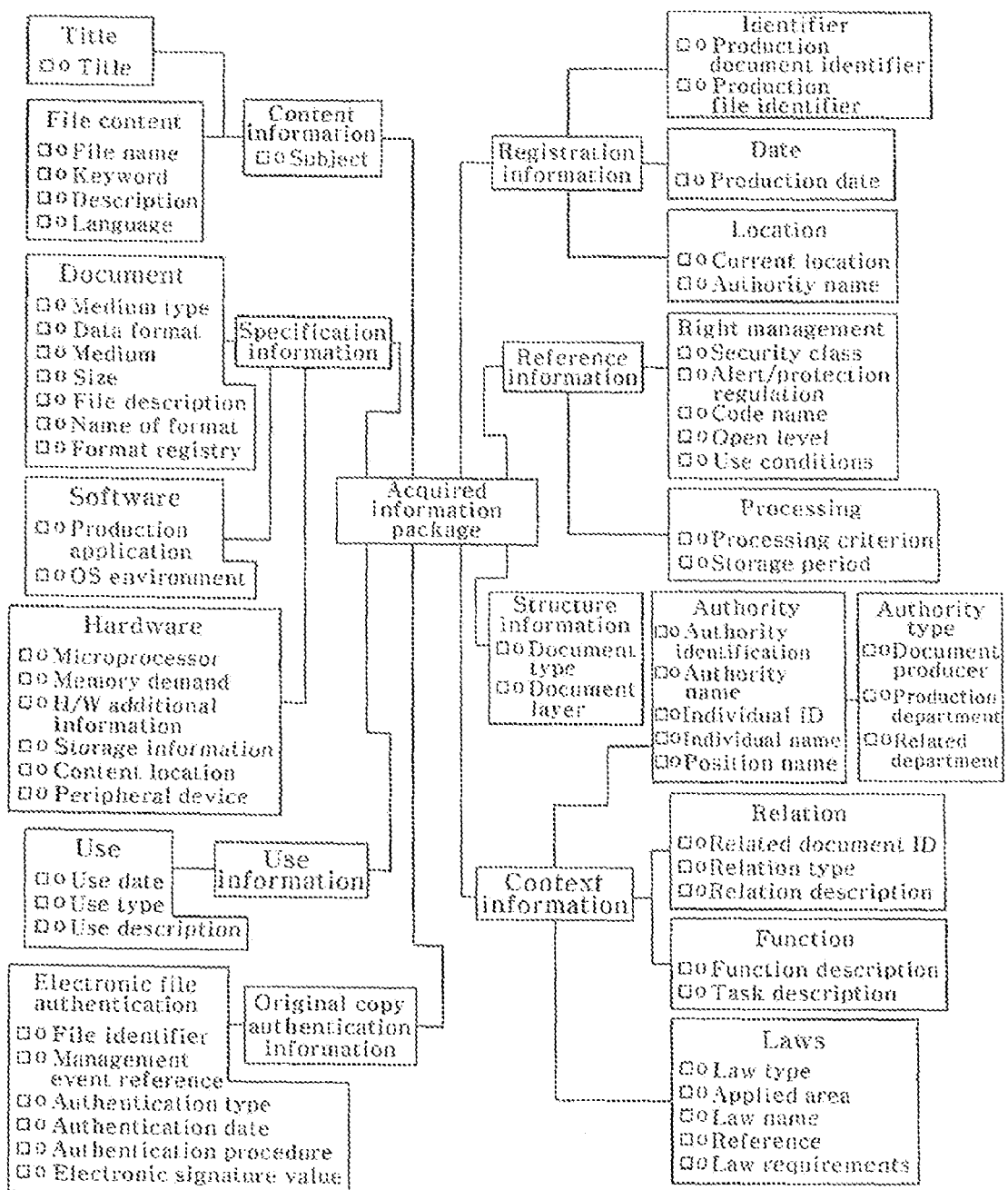
FIG. 2a is a class diagram of an electronic document information package transmitted by a user.
Figure 2B:
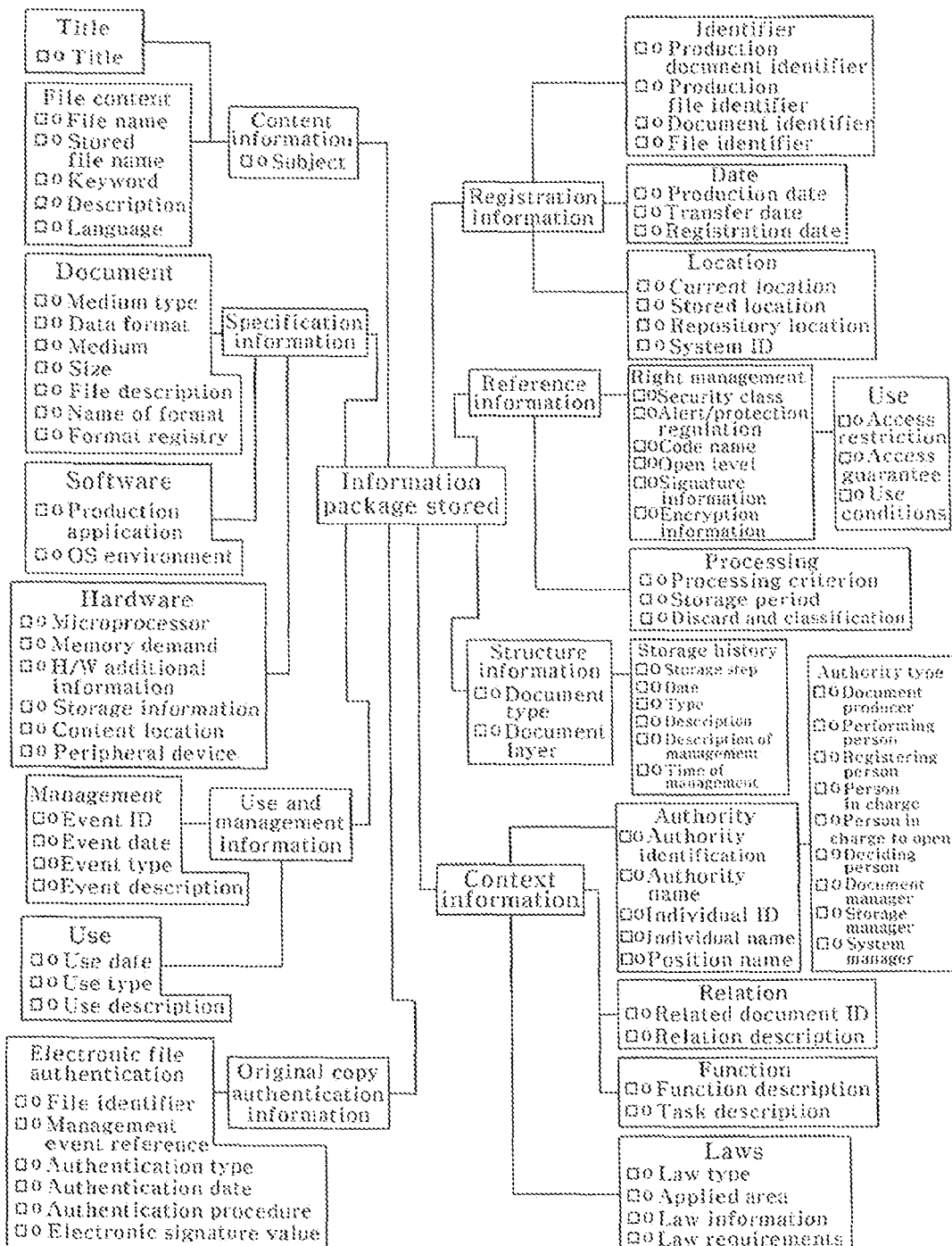
FIG. 2b is a class diagram of an electronic document information package stored in an electronic document repository system.

FIG. 2a is a class diagram of the electronic document information package transmitted by a user, and FIG. 2b is a class diagram of the electronic document information package stored in an electronic document repository system. The electronic document information package and associated metadata are stored in the database of the electronic document repository system. In particular, the storage medium must be compliance equipment with a Write Only Read Many (WORM) function. Also, once a storage period is set, the storage medium should not allow for deletion, forgery, and falsification of data during the period.

When the user wants an electronic document registered in the electronic document repository system, the retrieval module 104 retrieves the electronic document from the database. The electronic document may be retrieved by using metadata information of the electronic document, and a classification system.

Figure 3:
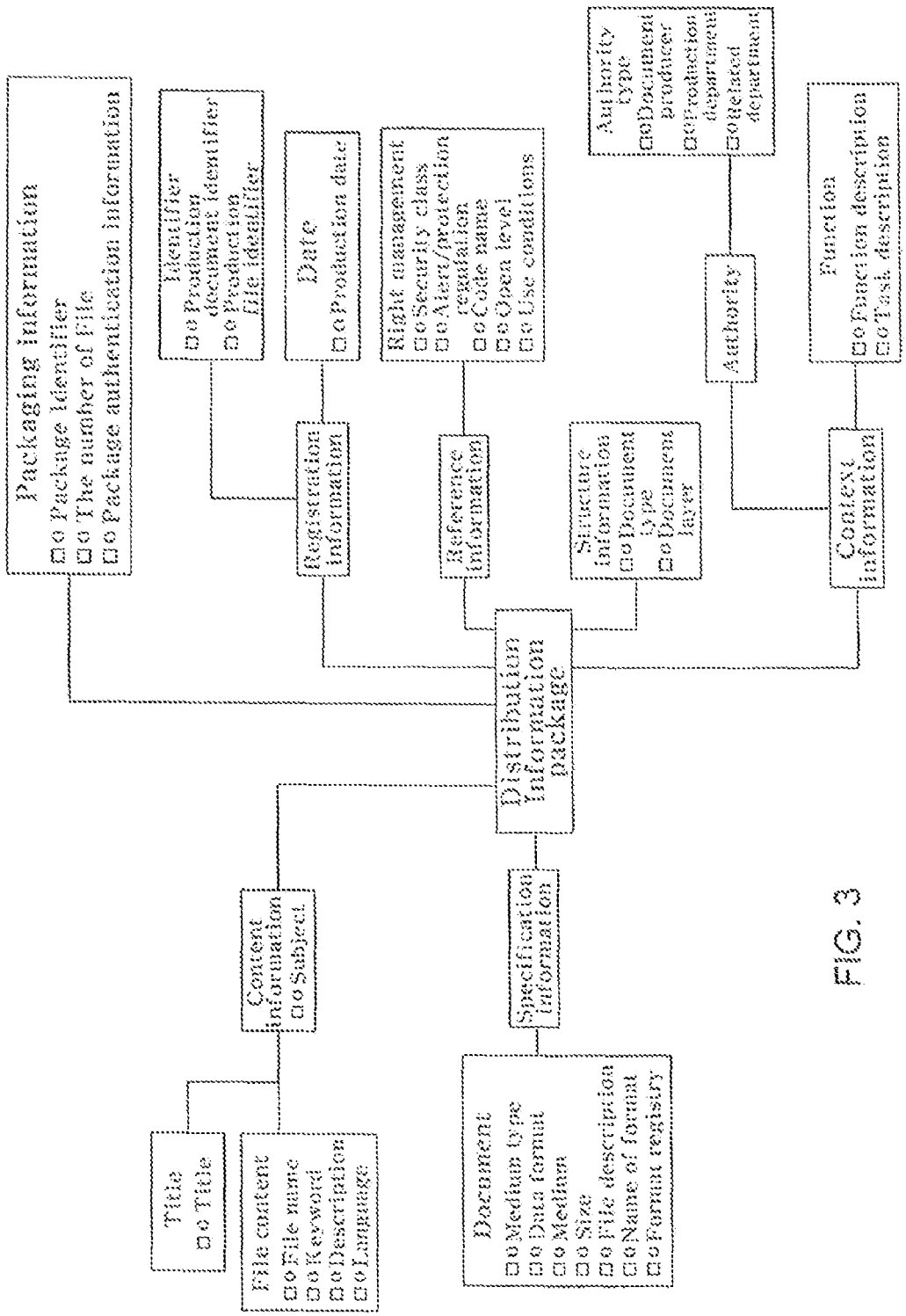
FIG. 3 illustrates a metadata structure of a reading information package.

Upon receipt of a request from the user to read the electronic document, the reading module 105 controls and manages reading of the electronic document according to a user's reading right. The electronic document is read in a manner of outputting content of the electronic document on a screen of the user terminal 100 connecting to the electronic document repository system 101. In this case, it is necessary to prevent the content of the electronic document from being modified, copied, stored, and screen-captured so that authenticity of the electronic document is guaranteed. Accordingly, the reading module 105 produces a reading information package according to the user's reading conditions, with the reading information package processed for reading security by Digital Rights Management (DRM), watermarking, and the like. The reading module 105 also performs security processing for transmission and reception when sending the reading information package to the user. FIG. 3 illustrates a structure of the metadata of the reading information package.

The issuing module 106 serves to control and manage issuing of the electronic document according to a user's issue right upon receipt of a request from the user to issue the electronic document. The issuing module 106 also serves to prevent and verify forgeries and falsifications of the electronic document content upon issuing the electronic document. The electronic document is issued in a manner of transmitting an issuing information package to the user. An electronic document having a publication format, such as metadata, Portable Document Format (PDF), or an image file, and authentication information such as an electronic signature are inserted into the issuing information package.

The issuing module 106 inserts a time stamp and an electronic signature to produce the issuing information package, and performs security processing for transmission and reception to transmit the issuing information package to the user. Preferably, the time stamp may conform to a KS X ISO/IEC 18014 "time-stamping" standard, and the electronic signature may be produced by using a hash algorithm such as SHA-1 and SHA-256 or an encryption algorithm such as PKC#7. In addition, the security processing for transmission and reception is intended to transmit and receive a message according to a standardized procedure and method and by using HyperText Transfer Protocol (HTTP), Simple Object Access Protocol (SOAP), File Transfer Protocol (FTP), and the like. The security processing for transmission and reception may include confidentiality and integrity processing for transmitted and received messages, such as a Virtual Private Network (VPN), and transmission security processing for a network path, such as a Secure Sockets Layer (SSL).

The management module 107 performs processing for discarding electronic documents stored in the electronic document repository system or storing the same for a long period. The management module 107 also transfers the electronic documents to another storage medium or platform in the electronic document repository system.

The process of discarding the electronic documents includes completely discarding the electronic documents in the database not to be restored and recording a discard history when the user requests to discard the electronic documents. If a storage period has been set for the electronic document, the management module 107 notifies the user of this fact when the storage period has time remaining, and discards the electronic document when the storage period has expired. Upon receipt of a request from the user for long-term storage of the electronic document, the management module records metadata information needed for long-term storage. The management module may transfer the electronic document information package to a secondary storage device and record a long-term storage history, if necessary.

Upon receipt of a request from the user to transfer an electronic document, the transfer module 108 checks a user's transfer right, transfers the electronic document to a receiving repository system, and discards the electronic documents from the transfer repository system. The electronic document is transferred by standard protocol and a messaging manner, and it is desirable to keep platform and language independence between the repository systems.

The certification module 109 issues a certificate to the user or verifies the issued certificate. Examples of the certificate include a registration certificate for registering an electronic document, a certificate of an original document used for issuing an electronic document, a discard certificate for discarding an electronic document, an authenticity certificate required for moving an electronic document to a storage medium or a platform, a transfer certificate for transferring an electronic document, etc.

When issuing the certificate, the certification module 109 generates a unique identifier of the certificate and a security value for guaranteeing integrity of the electronic document, and appends an electronic signature proving an issue authority and a certificate issue time. Preferably, the certificate includes a name of an issue requester (a name of a corporation), an identification number of the issue requester, such as a National Identification number, a Social Security number, etc. (a corporate registration number of a corporation), a serial number of the certificate, an issue request date and an issue date of the certificate, a validity period of the certificate, use of the certificate, and repository identification information.

The certificate verification includes verification of information for and a format of the issued certificate, verification of authenticity based on a verification route described in the certificate, verification of a certificate issue list of the repository system, and verification of integrity of the certificate based on an electronic signature, a time stamp value, a hash value and the like described in the certificate.

The printer module 110 controls printing of the electronic document when a user having a print right requests to print the electronic document while reading the electronic document, and controls printing of the electronic document and various certificates when the user prints the issued electronic document and the certificates. The printer module 110 must check a type of a printer connected to the user terminal and permits printing only when the printer is secure. The printer module 110 performs security processing such as 2D bar code processing when the electronic document is printed by the user terminal.

Methods by which the user registers an electronic document, a method by which the user reads the electronic document, a method for issuing the electronic document to the user, a method for transferring the electronic document, and a method for issuing a certificate of the electronic document will now be described with reference to FIGS. 4 to 8.

Figure 4:
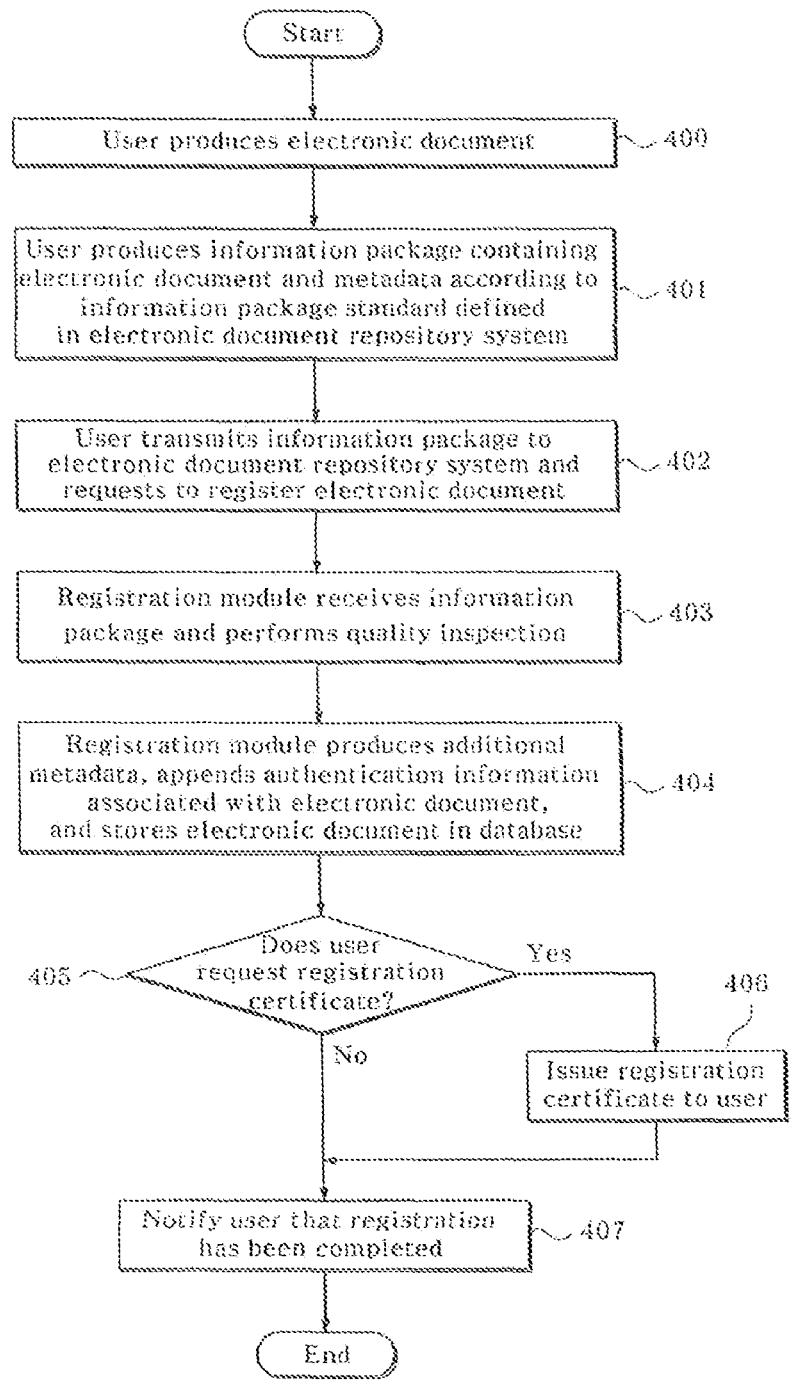
FIG. 4 is a flowchart illustrating a method of registering an electronic document according to an exemplary embodiment of the present invention.

FIG. 4 is a flowchart illustrating a method of registering an electronic document according to an exemplary embodiment of the present invention.

Referring to FIG. 4, a user produces an electronic document (S400) first. It will be easily appreciated that the electronic document may be first produced in an electronic form, or may be produced in an image form obtained by scanning a paper document.

To register the produced electronic document in the electronic document repository system, the user then produces an electronic document information package containing an electronic document, metadata, and authentication information, such as an electronic signature, according to a predetermined information package standard defined in the electronic document repository system (S401).

The user then transmits the electronic document information package to the electronic document repository system over a network by using the user terminal, and requests the registration module 103 of the electronic document repository system to register the electronic document (S402). Of course, the user needs to connect to the electronic document repository system and pass a login process in order to make a request for registration of the electronic document.

The registration module 103 then receives the information package and performs quality inspection on the information package (S403). The quality inspection includes checking for viruses and errors, and verifying metadata information of the electronic document described by the user. When the information package does not pass the quality inspection, the registration module 103 may notify the user of this fact and request supplementation for passing the quality inspection.

The registration module 103 then produces additional metadata, appends authentication information associated with the electronic document, and stores the electronic document in the database (S404). The authentication information may be a time stamp, an electronic signature, etc. A class diagram of the electronic document information package with the additional metadata is shown in FIG. 2b.

A determination is then made as to whether the user requests the registration certificate (S405). If the user requests the registration certificate, the certification module 109 issues the registration certificate to the user (S406).

Finally, the registration module 103 notifies the user that the registration has been completed (S407).

Figure 5:
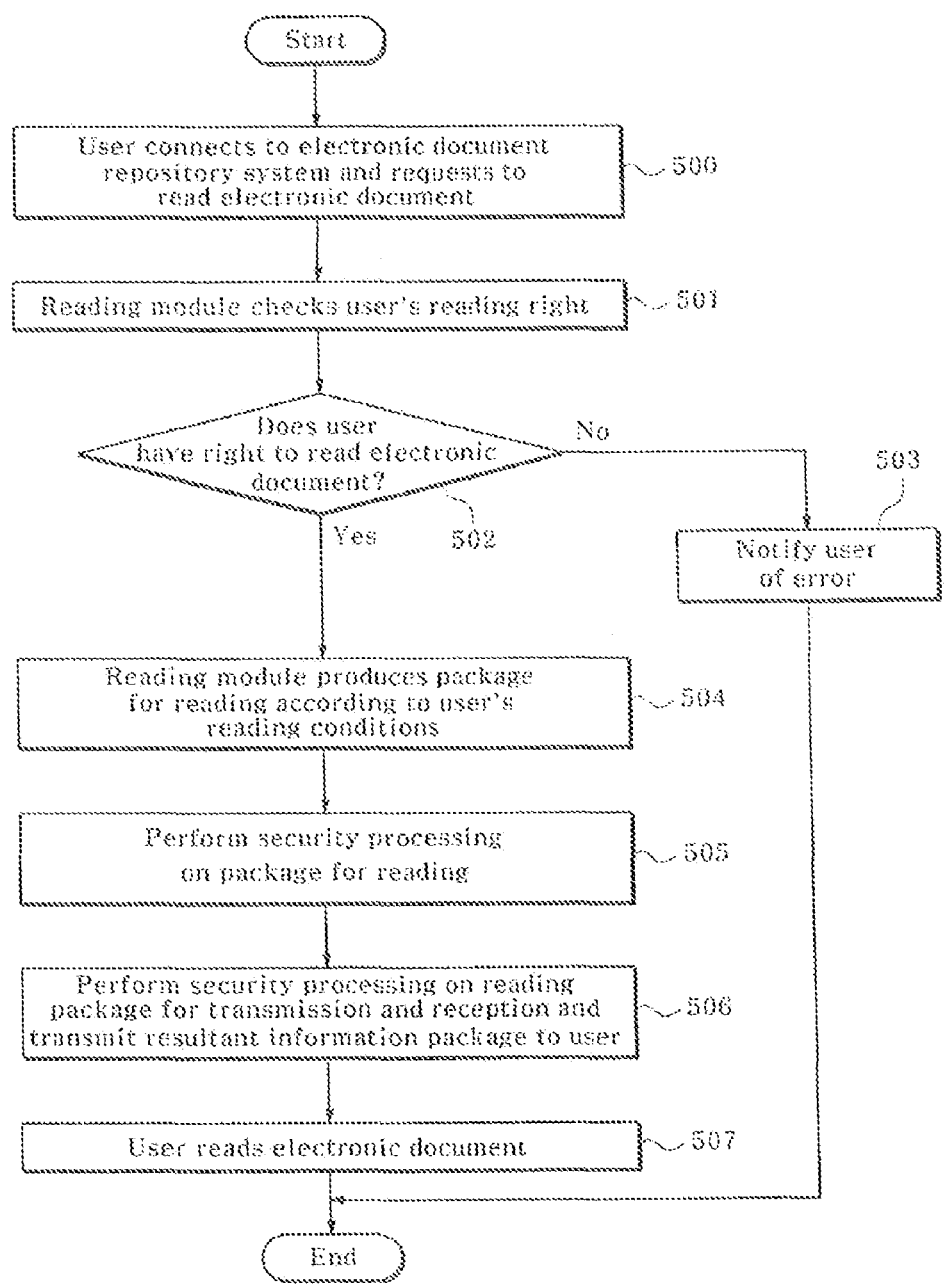
FIG. 5 is a flowchart illustrating a method of reading an electronic document according to an exemplary embodiment of the present invention.

FIG. 5 is a flowchart illustrating a method of reading an electronic document according to an exemplary embodiment of the present invention.

First, the user connects to the electronic document repository system and requests to read an electronic document (S500). In this case, the user may designate reading conditions for the electronic document.

The reading module 105 of the electronic document repository system then checks a user's reading right (S501). If the user has no right to read the electronic document, the reading module notifies the user of an error (S503).

The reading module 105 then produces a reading information package according to the user's reading conditions (S504). The reading information package is produced by initializing a reading information package, inserting metadata into the reading information package, converting an original electronic document stored in the electronic document repository system according to a user's request conditions, and inserting the converted electronic document into the reading information package.

The reading module 105 then performs reading security processing, such as Digital Rights Management (DRM), watermarking, and the like on the reading information package (S505). That is, it is necessary to prevent the content of the electronic document from being modified, copied, stored, and screen-captured when the user reads the electronic document, so that authenticity of the electronic document is guaranteed.

The reading module 105 then performs security processing on the reading information package for transmission and reception, and transmits the resultant information package to the user (S506).

The user then reads the electronic document by way of content of the electronic document output on a screen of the user terminal 100 (S507).

Figure 6:
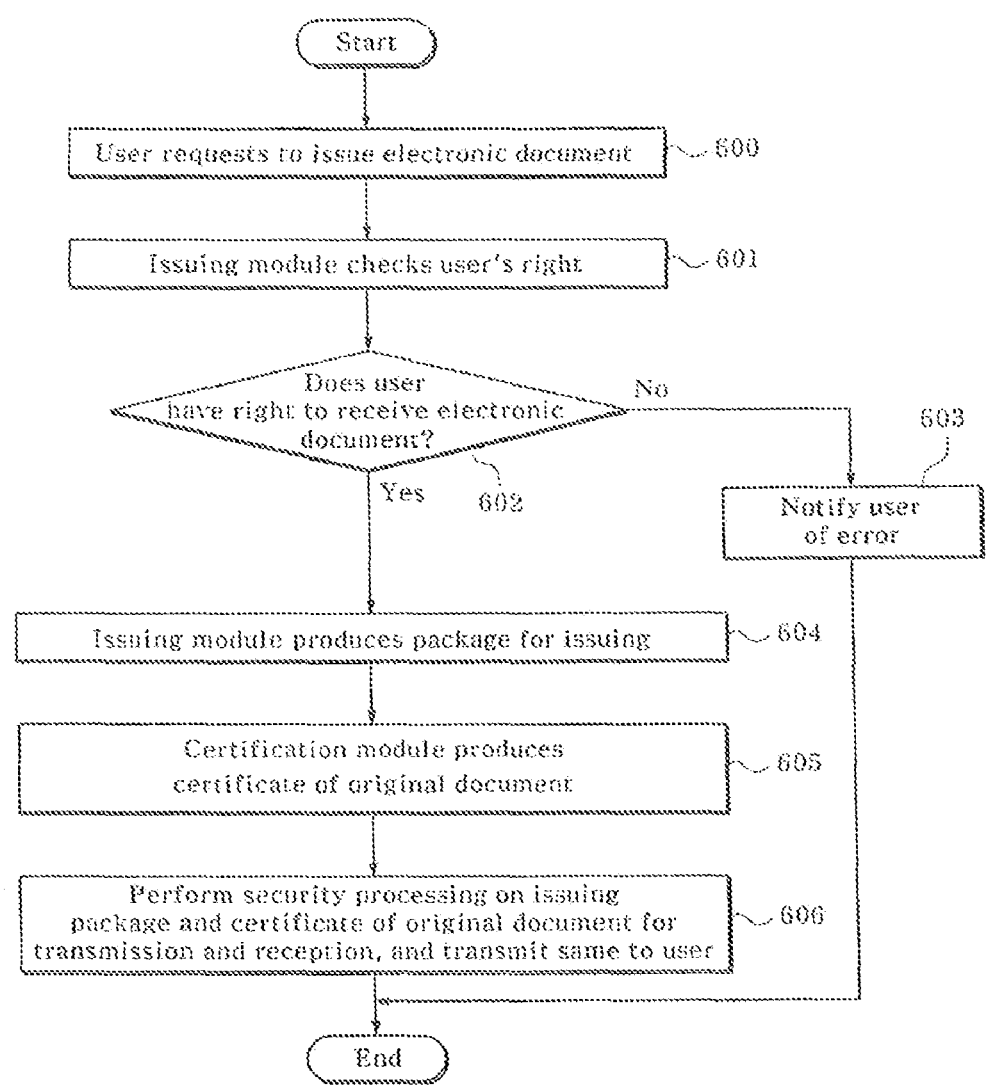
FIG. 6 is a flowchart illustrating a method of issuing an electronic document according to an exemplary embodiment of the present invention.

FIG. 6 is a flowchart illustrating a method of issuing an electronic document according to an exemplary embodiment of the present invention.

Referring to FIG. 6, the user connects to the electronic document repository system and requests the electronic document repository system to issue the electronic document (S600). In this case, the user may designate an electronic document issuing conditions.

The issuing module 106 of the electronic document repository system then checks a user's right (S601). If the user has no right to receive the electronic document, the issuing module 106 notifies the user of an error (S603) and the process stops.

The issuing module 106 then produces an issuing information package (S604). An electronic document having a publication format, such as metadata, PDF, or an image file, and authentication information such as an electronic signature are inserted into the issuing information package. A time stamp and an electronic signature are also inserted into the issuing information package to prevent forgery and falsification of content of the electronic document.

The certification module 109 then produces a certificate to certify that the issuing information package is an original document (S605). After issuing the certificate of the original document, the certification module 109 may record an issue history to the issue list.

The certification module 109 then performs security processing on the issuing information package for transmission and reception and the certificate of the original document and transmits the same to the user (S606).

Figure 7:
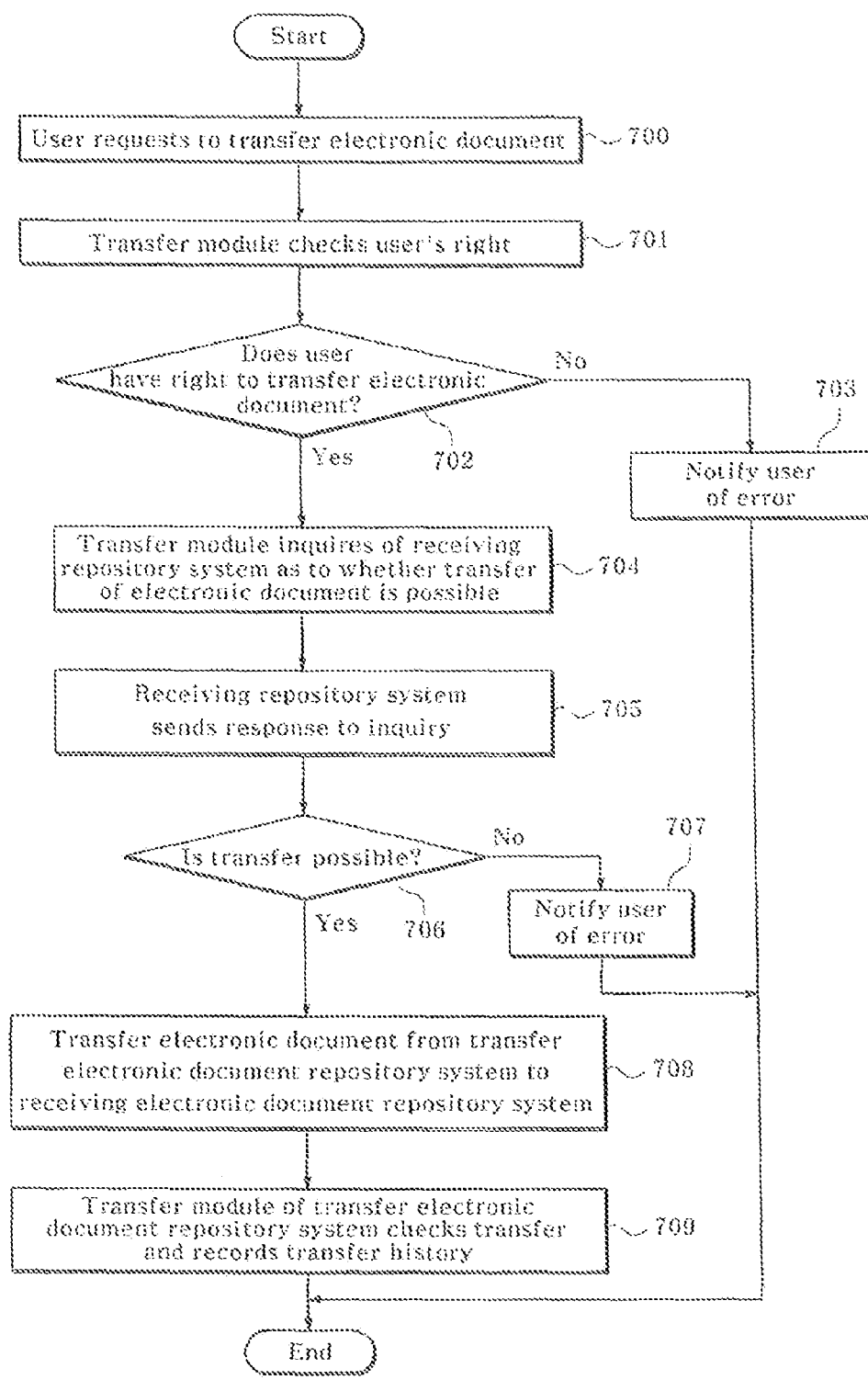
FIG. 7 is a flowchart illustrating a method of transferring an electronic document according to an exemplary embodiment of the present invention.

FIG. 7 is a flowchart illustrating a method of transferring an electronic document according to an exemplary embodiment of the present invention.

First, the user requests the electronic document repository system to transfer the electronic document to a specific receiving repository system (S700). It is common for the user to request to transfer the electronic document, however, the electronic document repository system storing the electronic document may itself determine to transfer the electronic document.

The transfer module 108 of the electronic document repository system then checks a user's right (S701). If the user has no right to transfer the electronic document, the transfer module 108 notifies the user of an error (S703) and the process ends.

The transfer module 108 then inquires of the receiving repository system as to whether transfer of the electronic document is possible (S704). The receiving repository system sends a response to the inquiry to the transfer module 108 (S705). If the transfer is not possible, the receiving repository system notifies the transfer module 108 of an error (S707).

If the transfer is possible the transfer module 108 transfers the electronic document from the transfer electronic document repository system to the receiving electronic document repository system (S708). Specifically, the transfer module 108 of the transfer electronic document repository system performs security processing for transmission and reception to transmit the electronic document information package together with related information, such as a certificate and history information. Accordingly, the receiving electronic document repository system performs a receiving process on the electronic document. That is, the receiving electronic document repository system receives the electronic document information package and the related information, performs quality inspection for suitability, and then registers the electronic document information package.

The transfer module of the transfer electronic document repository system then checks the transfer and records a transfer history (S709). If the user desires a transfer certificate, the certification module 109 produces the transfer certificate, issues it to the user, and records a certificate issue history. The certification module of the receiving electronic document repository system issues a registration certificate to the user.

Figure 8:
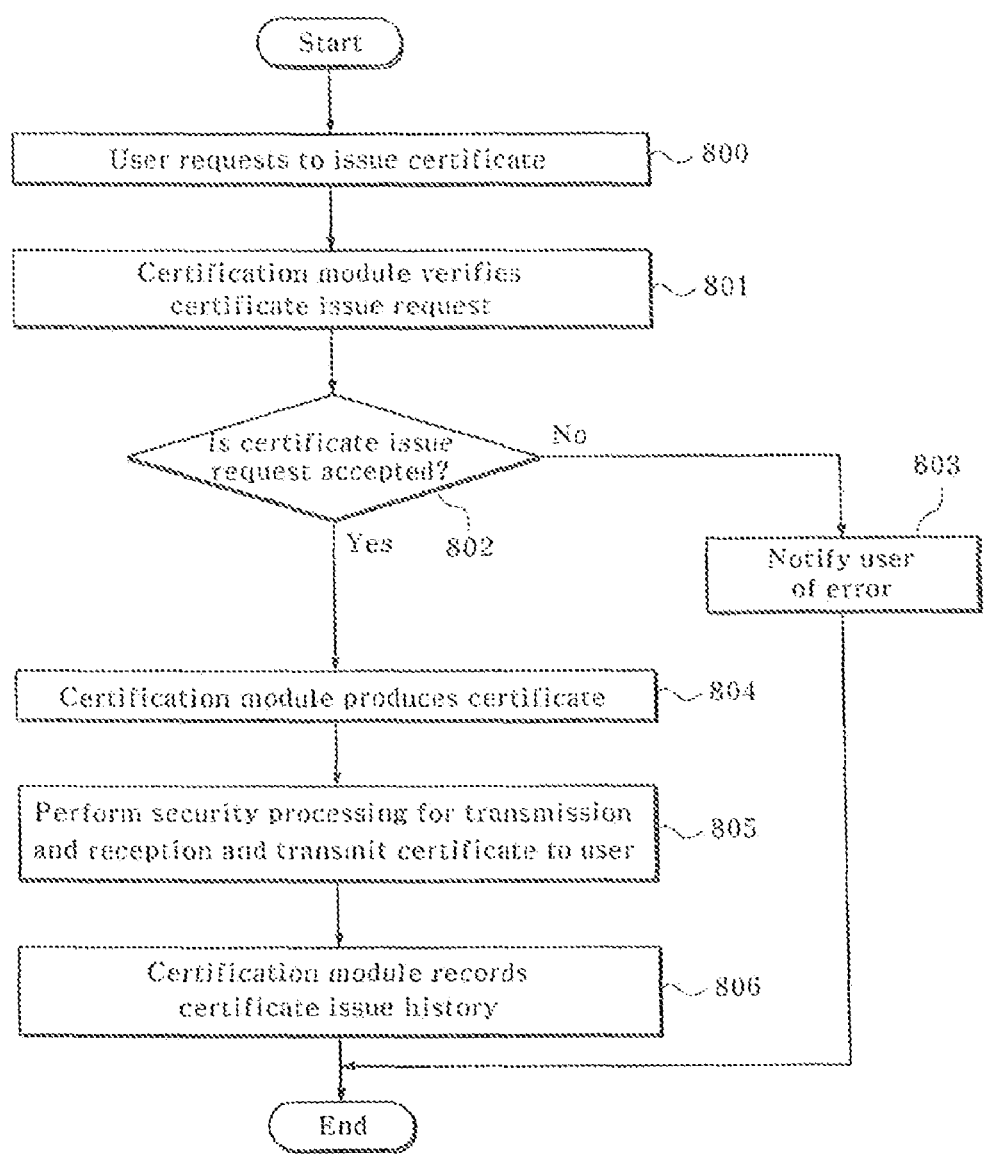
FIG. 8 is a flowchart illustrating a method of issuing a certificate of an electronic document according to an exemplary embodiment of the present invention.

FIG. 8 is a flowchart illustrating a method of issuing a certificate of an electronic document according to an exemplary embodiment of the present invention.

First, the user requests the certification module 109 of the electronic document repository system to issue a certificate (S800). Examples of the certificate include a registration certificate for registering an electronic document, a certificate of an original document used for issuing an electronic document, a discard certificate for discarding an electronic document, an authenticity certificate required for moving an electronic document to a storage medium or a platform, a transfer certificate for transferring an electronic document, etc.

Upon receipt of the request for the certificate, the certification module 109 verifies the request (S801). If the registration certificate is requested, the certification module 109 issues the registration certificate only if the user has a right to register the electronic document. If the certificate issue request cannot be accepted, the certification module 109 notifies the user of an error (S803).

If the certificate issue request is accepted, the certification module 109 produces a certificate (S804). The certificate may be produced by initializing a certificate format, inserting certificate related information into the certificate format, and performing security processing. Preferably, the certificate includes a name of an issue requester (a name of a corporation), an identification number of the issue requester, such as a National Identification number, a Social Security number, etc. (a corporate registration number of a corporation), a serial number of the certificate, an issue request date and an issue date of the certificate, a validity period of the certificate, use of the certificate, and repository identification information.

The certification module 109 then performs security processing for transmission and reception and transmits a certificate to the user (S805). Finally, the certification module 109 modifies the certificate issue list and records the certificate issue history (S806).

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An electronic document repository system connected to a user terminal over a network for guaranteeing authenticity of an electronic document and issuing an authenticity certificate, the system comprising:
   an authentication module for performing user authentication through a login process and controlling a system access right depending on a user when the user connects to the electronic document repository system;
   a registration module for checking an electronic document information package sent by the user, producing metadata, appending authentication information to the electronic document information package, and registering the resultant electronic document in a computer database;
   a reading module for producing a reading information package according to a user's reading right, performing security processing on the reading information package, and transmitting the resultant reading information package to the user upon receipt of a request from the user to read the electronic document;
   an issuing module for producing an issuing information package according to a user's issue right, performing security processing on the issuing information package, and transmitting the resultant issuing information package to the user upon receipt of a request from the user to issue the electronic document; and
   a certification module for issuing a certificate of the electronic document to the user or verifying the issued certificate.

2. The system of claim 1, wherein in the authentication module, the user authentication uses a licensed certificate, and the control of the system access right uses an Access Control List (ACL).

3. The system of claim 1, wherein in the registration module, the electronic document sent by the user is first produced in an electronic form or in an image form obtained by scanning a paper document.

4. The system of claim 1, further comprising a retrieval module for retrieving the registered electronic document from the database when the user desires to search for the electronic document.

5. The system of claim 1, wherein in the reading module, the electronic document is read in such a manner that the user terminal receives the reading information package and outputs content of the electronic document on a screen of the user terminal, and the content of the electronic document is prevented from being modified, copied, stored, and screen-captured when read so that authenticity of the electronic document is guaranteed.

6. The system of claim 1, wherein the issuing module produces the issuing information package with metadata, the electronic document, a time stamp, and an electronic signature.

7. The system of claim 1, further comprising a management module for discarding stored electronic documents or storing the same for a long period, and transferring the electronic documents to another storage medium or platform in the electronic document repository system.

8. The system of claim 1, further comprising a transfer module for checking a user's transfer right, transferring the registered electronic document to a receiving repository system, and discarding the electronic document stored in the database upon receipt of a request from the user to transfer the registered electronic document.

9. The system of claim 1, wherein when issuing the certificate, the certification module generates a unique identifier of the certificate and a security value for guaranteeing integrity of the electronic document, the certificate including a name of an issue requester (a name of a corporation), an identification number of the issue requester (a corporate registration number of a corporation), a serial number of the certificate, an issue request date and an issue date of the certificate, a validity period of the certificate, use of the certificate, and repository identification information.

10. The system of claim 1, wherein in the certification module, the certificate verification includes verification of information and a format of the issued certificate, verification of authenticity based on a verification route described in the certificate, verification of a certificate issue list of the repository system, and verification of integrity of the certificate based on an electronic signature, a time stamp value, and a hash value described in the certificate.

11. The system of claim 1, further comprising a printer module for controlling printing of the electronic document upon receipt of a request from the user to print electronic documents or various certificates, wherein the printer module checks a type of a printer connected to the user terminal and permits printing only if the printer is secure.

12. A method of registering an electronic document in the electronic document repository system according to claim 1, the method comprising the steps of:
   (a) producing, by a user terminal, an electronic document information package containing the electronic document, metadata, and authentication information according to a predetermined information package standard;

(b) transmitting, by the user terminal, the electronic document information package to the electronic document repository system, and requesting to register the electronic document;

(c) receiving, by the registration module, the electronic document information package and performing quality inspection on the electronic document information package;

(d) producing, by the registration module, additional metadata, appending authentication information to the electronic document information package, and storing the electronic document in the database; and (e) notifying, by the registration module, the user terminal that the registration has been completed.

13. The method of claim 12, wherein the quality inspection in step (c) includes checking for viruses, checking for errors, and verifying the metadata information of the electronic document described by the user.

14. The method of claim 12, wherein the certification module issues the registration certificate to the user upon receipt of a request for the registration certificate from the user.

15. A method of reading an electronic document in the electronic document repository system according to claim 1, the method comprising the steps of:

(a) requesting, by a user terminal, to read the electronic document;

(b) checking, by a reading module, a user's reading right;

(c) producing, by the reading module, a reading information package according to the user's reading conditions;

(d) performing, by the reading module, security processing on the reading information package to guarantee authenticity of the electronic document;

(e) performing security processing on the reading information package for transmission and reception, and transmitting the resultant reading information package to the user terminal; and (f) reading, by the user terminal, the electronic document by way of content of the electronic document output on a screen of the user terminal.

16. The method of claim 15, wherein step (c) comprises the steps of:

initializing the reading information package;

inserting metadata of the electronic document to be read into the reading information package; and converting the electronic document to be read that is stored in the electronic document repository system according to a user's request conditions, and inserting the converted electronic document into the reading information package.

17. A method of issuing an electronic document in the electronic document repository system according to claim 1, the method comprising the steps of:

requesting, by a user terminal, to issue the electronic document; checking, by an issuing module, a user's issue right;

producing, by the issuing module, an issuing information package;

producing, by the certification module, a certificate to certify that the issuing information package is an original document; and performing security processing on the issuing information package and the certificate of the original document for transmission and reception, and transmitting the same to the user terminal.

18. The method of claim 17, wherein metadata, the electronic document, a time stamp, and an electronic signature are inserted into the issuing information package.

19. A method of transferring an electronic document in the electronic document repository system according to claim 1, the method comprising the steps of:

(a) requesting, by a user terminal, a specific receiving repository system to transfer the electronic document;

(b) checking, by a transfer module, a user's right;

(c) inquiring, by the transfer module, of the receiving repository system as to whether transfer of the electronic document is possible;

(d) sending, by the receiving repository system, a response to the inquiry to the transfer module;

(e) when the transfer is possible, transferring the electronic document from the transfer electronic document repository system to the receiving electronic document repository system; and (f) checking, by the transfer module, the transfer and recording a transfer history.

20. The method of claim 19, wherein step (e) comprises the steps of:

performing, by the transfer module of the transfer electronic document repository system, security processing for transmission and reception and transmitting the electronic document;

receiving, by the receiving electronic document repository system, the electronic document and performing quality inspection on the electronic document; and registering, by the receiving electronic document repository system, the electronic document.

21. A method of issuing a certificate of an electronic document in the electronic document repository system according to claim 1, the method comprising the steps of:

(a) requesting, by a user terminal, to issue a certificate;

(b) verifying, by a certification module, a certificate issue request;

(c) when the certificate issue request can be accepted, producing the certificate by the certification module;

(d) performing, by the certification module, security processing for transmission and reception and transmitting the certificate to the user terminal; and (e) modifying, by the certification module, a certificate issue list and recording a certificate issue history.

22. The method of claim 21, wherein the certificate includes a registration certificate for registering an electronic document, a certificate of an original document used for issuing an electronic document, a discard certificate for discarding an electronic document, an authenticity certificate required for storing an electronic document for a long period, and a transfer certificate for transferring an electronic document.

23. The method of claim 21, wherein step (c) includes producing the certificate by initializing a certificate format, inserting certificate related information into the certificate format, and performing security processing.

* * * * *